Nov. 1, 1966   N. H. SACHNIK   3,282,113
PIPELINE SAMPLER

Filed Aug. 26, 1964                                       2 Sheets-Sheet 1

INVENTOR.
NORMAN H. SACHNIK
BY
ATTORNEY

Nov. 1, 1966  N. H. SACHNIK  3,282,113
PIPELINE SAMPLER

Filed Aug. 26, 1964

INVENTOR.
NORMAN H. SACHNIK

3,282,113
PIPELINE SAMPLER
Norman H. Sachnik, Houston, Tex., assignor to
Texsteam Corporation
Filed Aug. 26, 1964, Ser. No. 392,131
3 Claims. (Cl. 73—422)

This invention relates in general to a pipeline sampler, and more particularly to a unitized pump and valve system capable of removing a sample of pipeline product from a pipeline and delivering same to a sampler container under controlled conditions. The invention is particularly useful in permitting periodic analysis of a pipeline product, such as oil or the like, where it is desirous of determining the conditions and quality of the oil.

In accordance with the present invention, the pipeline sampler includes a pump for drawing samples of oil from a pipeline and for pumping the samples through a three-way valve, and selectively back to the pipeline or to a sampler container. Normally, the oil is being returned to the pipeline until actuation of the three-way valve which directs a sample to the sampler container. Thus, there is a continuous change of oil going through the pump to insure a good representation of the oil that is flowing through the pipeline. For control of the three-way valve, a meter device registers the flow of oil through the pipeline and periodically signals the three-way valve to direct a sample of oil to the sampler container. Electrical circuit means is provided for interconnecting the meter device and the actuation of the three-way valve, all of which is interrelated with the action of the pump. In drawing off a portion of the oil from the sampler container for analyzing, means is provided to thoroughly mix the oil in the container so that a representative sample can be provided. Thereafter the unused oil may be pumped back into the pipeline to ready the sampler container for the next run of oil.

Therefore, it is an object of this invention to provide a pipeline sampler for obtaining a sample of the products conveyed in a pipeline.

Another object of this invention is in the provision of a pipeline sampler capable of obtaining a representative sample of a product being conveyed in a pipeline in response to flow through the pipeline.

Another object of this invention is to provide a pipeline sampler including a pump having its suction end connected to the pipeline and its discharge end connected to a three-way valve that has one outlet connected back to the pipeline and another outlet connected to a sampler container, and wherein a meter device responsive to the flow of the product in the pipeline periodically actuates the three-way valve to direct a sample to the sampler container.

A further object of this invention resides in the provision of a pipeline sampler including a metering pump capable of drawing metered amounts of oil from a pipeline and delivering same to a three-way valve having one outlet leading back to the pipeline and another outlet leading to a sampler container, and wherein a flow measuring device on the pipeline interacts in an electric circuit with the pump to control operation of the three-way valve and periodically direct oil samples to the sampler container.

Other objects, features and advantages of the invention will be apparent from the following detailed disclosure, taken in conjunction with the accompanying sheets of drawings, wherein like reference numerals refer to like parts, in which.

Figure 1:
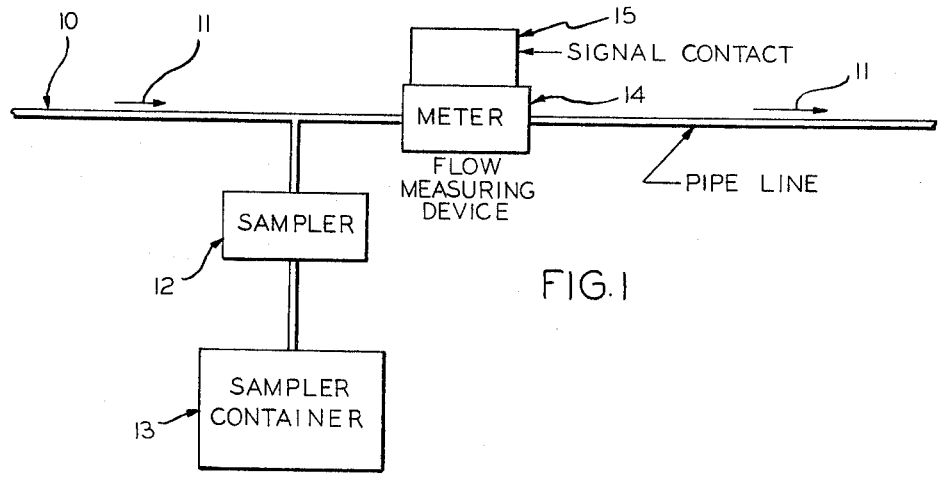
FIG. 1 is a diagrammatic view in block diagram of the present invention as associated with a pipeline.

Referring now to the drawings and particularly to FIG. 1, a pipeline 10 for conveying fluids such as oil is shown wherein the flow of oil is in the direction of the arrows 11. The sampler of the present invention is illustrated by the block 12 which has interrelated therewith the sample container 13. A flow measuring device 14 is mounted to measure the flow of fluid through the pipeline 10 downstream of the sampler 12, and provided with a signal contact 15 which controls the operation of the sampler 12 as will be more clearly hereinafter explained.

Figure 2:
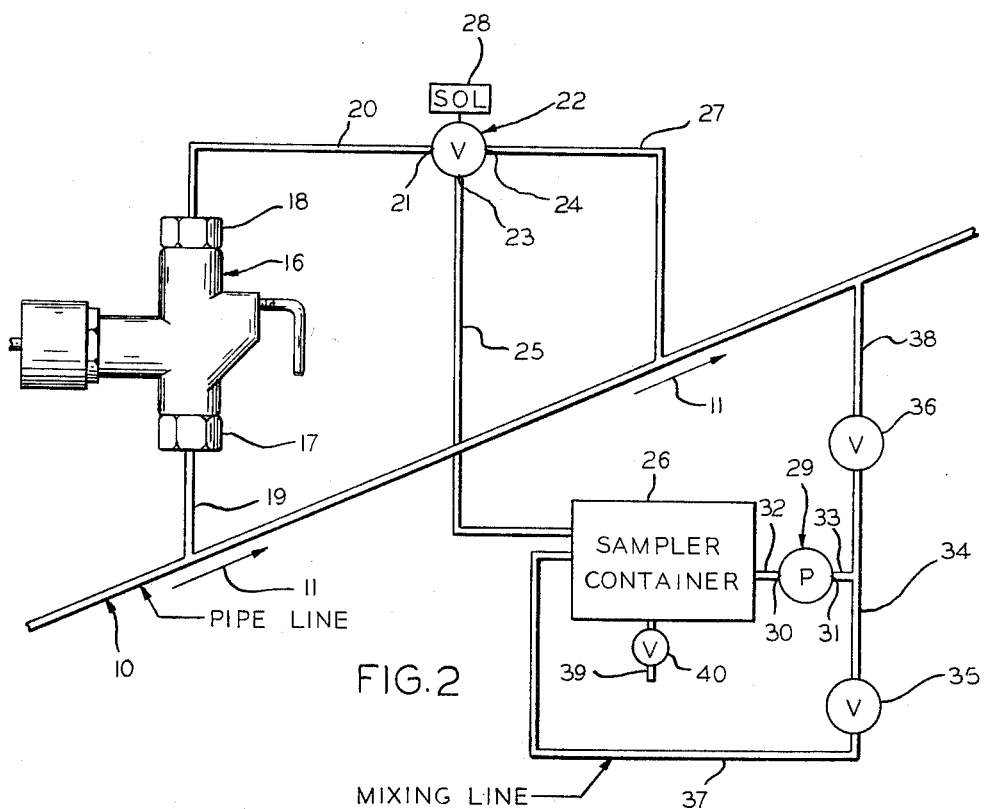
FIG. 2 is a diagrammatic view of the piping arrangement for the present invention to illustrate the paths of flow of the product from the pipeline.

Referring now to FIG. 2, the sampler 12 includes a positive displacement pump 16 that also may be referred to as a metering pump in that it is capable of metering the flow therethrough. The pump 16 includes a suction head 17 and a discharge head 18. A short line 19 interconnects the suction head 17 to the pipeline 10.

A line 20 interconnects the discharge head 18 of the pump 16 to a inlet 21 of a three-way valve 22. The valve includes outlets 23 and 24, the first of which is connected to a line 25 that leads into a sampler container 26. The outlet 24 is connected to a line 27 that returns to the pipeline 10 downstream of the line 19 that draws the oil into the pump 16. A solenoid 28 actuates the three-way valve 22 to selectively connect the inlet 21 to one of the outlets 23 or 24 and thereby direct the flow of oil through the line 20 either through the line 25 to the sampler container 26 or through the line 27 back to the pipeline 10.

When it is desired to draw a sample from the sampler container 26 for analysis, the contents of the container are thoroughly mixed by energizing a pump 29 having an inlet 30 and an outlet 31. The inlet is connected by a line 32 to the sampler container 26 and the outlet is connected to a line 33 that further connects into a line 34 having a control valve 35 on the lower end and a control valve 36 on the upper end. The control valve 35 is further connected to the sampler container 26 by a mixing line 37, while the valve 36 is connected to the pipeline 10 by a return line 38. Both the valves 35 and 36 are two-way valves and respectively control oil flow through the mixing line 37 and the return line 38. When mixing the oil within the container, the valve 36 is closed to prevent flow of oil into the return line 38 and the pipeline 10, while the valve 35 is opened to permit flow through the mixing line 37. After the oil in the container is thoroughly mixed, a sample is drawn through the spigot 39 after opening the valve 40. Thereafter, the remaining unused oil in the container may be returned to the pipeline 10 by closing the valve 35 and opening the valve 36, and thereby ready the sampler container for the next run of oil through the pipeline.

Figure 3:
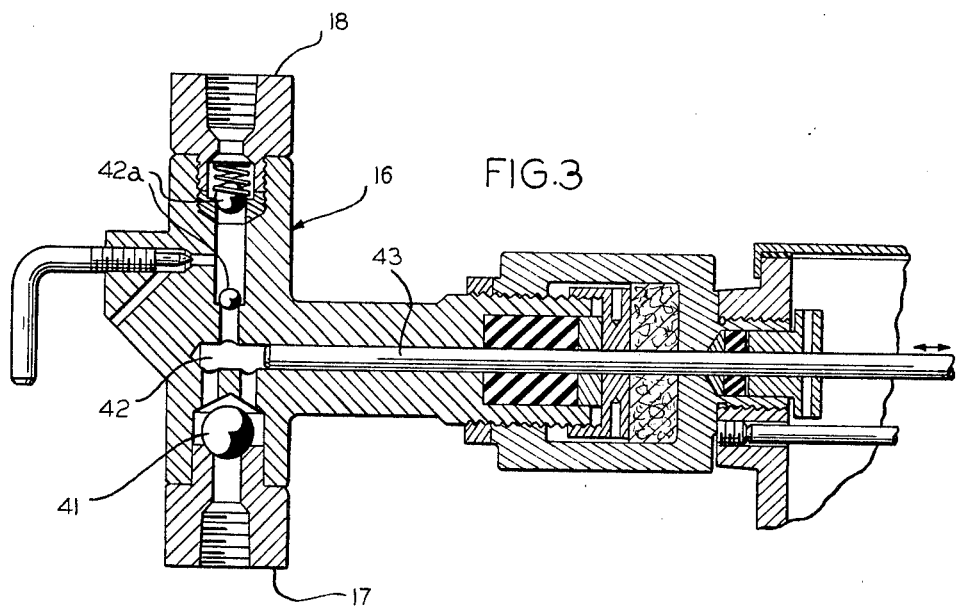
FIG. 3 is an axial sectional view taken through the metering pump employed in the present invention to pump samples of oil from the pipeline.

While it should be understood that any type of pump may be employed for drawing samples from the pipeline 10, it is preferable that a plunger type pump be employed such as shown more clearly in FIG. 3. At the inlet or suction head 17, a ball check valve 41 prevents return of oil to the pipeline 10 that has been drawn into the pump while permitting it to readily flow into the pumping chamber 42. A plunger or piston 43 functions to draw oil into the pumping chamber 42 during its suction stroke which would be toward the right-hand end of the pump as viewed in FIG. 3, and thereafter to force the oil out of the pumping chamber and up through a double ball check valve 42a and out the discharge head or outlet 18. The double check valve 42a prevents back up of oil through the discharge head 18 to thereby enhance the accurate metering of the pump, wherein a certain amount of oil is pumped during each pumping stroke of the plunger 43 which is toward the left as viewed in FIG. 3.

Figure 4:
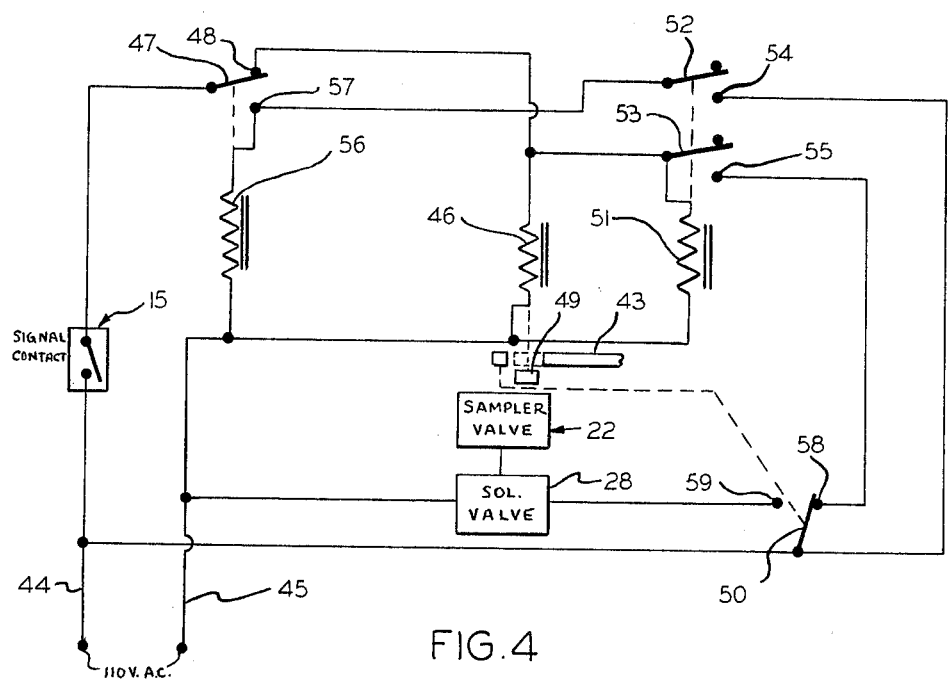
FIG. 4 is an electrical schematic diagram showing the circuitry employed for operating the three-way valve through the pipeline flow measuring device and the metering pump.

Referring now particularly to FIG. 4 and the electrical circuitry employed for carrying out the operation of the sampler, it is seen that the signal contact 15 operated by the flow measuring device is connected at one end to one side 44 of the line voltage, the other side being 45. Upon the closing of the signal contact 15, which would be periodic in accordance with the measured flow of oil through the pipeline, a solenoid 46 is energized through the switch arm 47 and contacts 48 to pull a lever or device 49 into the path of the plunger 43 of the pump 16 so that the switch arm 50 will be actuated upon the return stroke of the plunger 43. Also, the relay 51 will be energized to respectively bring switch arms 52 and 53 into engagement to close contacts 54 and 55. Closing of contacts 55 completes a circuit through the switch to hold the solenoid 46 and relay 51 closed or energized. At the same time, current through the closed contacts 54 will energize the relay 56 that brings the switch arm 47 into engagement to close contacts 57 while at the same time opening contacts 48. This sets up a holding condition for the relay 56. Further actuation of the signal contacts 15 will have no further effect on the circuit until the switch 50 is mechanically activated by the plunger 43. Upon activation of the switch 50 by the plunger 43, the contacts 58 are opened and the contacts 5 are closed by the switch arm 50. Opening of the contacts 58 releases the relay 51 and the solenoid 46, but not the relay 56 unless the signal contact 15 is open. Closing of the contacts 59 causes energization of the solenoid 28 to actuate the three-way valve 22 and allow one sample stroke to be diverted to the sample container 26. If for any reason the signal contact 15 has not been opened during this operation, then no further operation of the circuit can be caused as contacts 48 are open. When the signal contact 15 is opened, the relay 56 is de-energized causing the contacts 48 to close and set up the circuit for the next cycle of operation. Thus, the circuitry of FIG. 4 functions to energize the valve 22 in response to closing of the signal contact on the flow measuring device 14 and the operation of the pump plunger 43. It should be appreciated that the pump 16 is in continuous operation and would normally be pumping oil through the valve 22 and back to the pipeline except during the times that the signal device 15 is operated to draw a sample into the sampler container 26.

It should be further appreciated that the present invention may be easily adapted to function as a chemical injector for injecting chemicals into a pipeline, wherein the circuitry of the pump 16 would be associated with the sampler container 26 that would now act as a reservoir for a chemical so that metered amounts of chemicals would be injected into the pipeline from the container in response to signals received from the flow measuring device on the pipeline.

It will be understood that modifications and variations may be effected without departing from the scope of the novel concepts of the present invention, but it is understood that this application is to be limited only by the scope of the appended claims.

The invention is hereby claimed as follows:

1. A pipeline sampler for a pipeline carrying fluid products therein comprising, a pump having a suction head and a discharge head, means for connecting the suction head to said pipeline, a solenoid-actuated three-way valve having an inlet, two outlets and means for selectively connecting the inlet to either of said outlets, means connecting said inlet to said discharge head of said pump, means connecting one of said outlets to said pipeline downstream of the connection with the suction head, a sampler container, means connecting the other outlet to said container, flow measuring means on said pipeline, and electrical circuit means responsive to said flow measuring means and said pump for actuating said valve to direct a sample into the sampler container, said circuit means including a first solenoid energized by a signal contact from said flow measuring means, means operated by said solenoid to render closing of first contacts and opening of second contacts by said pump, a first relay also energized by said signal contact to operate second contacts which in turn energizes a third relay, means deenergizing said solenoid and first relay upon opening of said second contacts, and said second relay being deenergized by said signal contact.

2. A pipeline sampler for a pipeline carrying fluid products therein comprising, a reciprocal plunger pump having a suction head and a discharge head, means connecting the suction head to the pipeline, a solenoid-actuated three-way valve having an inlet, two outlets and means for selectively connecting the inlet to either of said outlets, means connecting the inlet to said discharge head of said pump, means connecting one of said outlets to said pipeline downstream of the connection with the suction head, a sampler container, means connecting the other outlet of said valve to said container, a flow measuring means on said pipeline having signal contacts closable periodically in response to the flow through said pipeline, electric circuit means interconnected with said solenoid of said valve, said signal contacts, a solenoid-operated device associated with the plunger of the pump, and contacts closable by action of said plunger when said solenoid-operated device is energized to operate said valve for connecting the discharge head of the pump to the sampler container.

3. A pipeline sampler for a pipeline carrying fluid products therein comprising, a pump having a suction head and a discharge head, means for connecting the suction head to said pipeline, a solenoid-actuated three-way valve having an inlet, two outlets and means for selectively connecting the inlet to either of said outlets, means connecting said inlet to said discharge head of said pump, means connecting one of said outlets to said pipeline downstream of the connection with the suction head, a sampler container, means connecting the other outlet to said container, means operating said valve in response to the flow in said pipeline, and means for selectively mixing the contents of the sampler container or returning the contents to the pipeline including a second pump having an inlet connected to the sampler container and an outlet connected to the sampler container for recirculating the contents, a valve between the outlet and the sampler container for controlling the recirculating of the contents, a line between the outlet and the pipeline having a valve therein for controlling flow therethrough.

References Cited by the Examiner
UNITED STATES PATENTS 2,636,387  4/1953  McKinney _____ 73—422
2,745,484  5/1956  Eckstrom et al. _____ 73—434

OTHER REFERENCES

Dinda et al: Oil & Gas Journal, May 21, 1956, pp. 251–253.

LOUIS R. PRINCE, *Primary Examiner.*

S. CLEMENT SWISHER, *Assistant Examiner.*